United States Patent
Knafou et al.

(10) Patent No.: US 7,791,785 B2
(45) Date of Patent: Sep. 7, 2010

(54) CONTROLLABLY DISPLAYABLE MOTOR VEHICLE WINDOW AND METHOD OF ADVERTISING OR MESSAGING WITH THE SAME

(75) Inventors: Danny Knafou, Ofakim (IL); Michael Herman, Ofakim (IL)

(73) Assignee: Webnet Ltd., Beer Sheva (IL)

( * ) Notice: Subject to any disclaimer, the term of this patent is extended or adjusted under 35 U.S.C. 154(b) by 0 days.

(21) Appl. No.: 11/996,297

(22) PCT Filed: Jul. 20, 2006

(86) PCT No.: PCT/IL2006/000847

§ 371 (c)(1),
(2), (4) Date: Feb. 11, 2008

(87) PCT Pub. No.: WO2007/010542

PCT Pub. Date: Jan. 25, 2007

(65) Prior Publication Data

US 2008/0231934 A1    Sep. 25, 2008

(30) Foreign Application Priority Data

Jul. 21, 2005    (IL) .................................... 169824

(51) Int. Cl.
*G02F 1/153* (2006.01)
*G02F 1/03* (2006.01)
*H04N 9/16* (2006.01)

(52) U.S. Cl. ................ 359/275; 359/242; 348/817
(58) Field of Classification Search ......... 359/265–275, 359/277, 245–247, 254, 242; 345/49, 105; 250/70; 348/817; 438/929
See application file for complete search history.

(56) References Cited

U.S. PATENT DOCUMENTS

| 6,457,286 | B1 * | 10/2002 | Eliyahu et al. | 52/171.3 |
| 6,580,472 | B1 * | 6/2003 | Willingham et al. | 349/16 |
| 2003/0162312 | A1 * | 8/2003 | Takayama et al. | 438/22 |

OTHER PUBLICATIONS

International Preliminary Report on Patentability for corresponding PCT application—6 pages—Jan. 22, 2008.

* cited by examiner

*Primary Examiner*—Scott J Sugarman
*Assistant Examiner*—Dawayne A Pinkney
(74) *Attorney, Agent, or Firm*—Roach Brown McCarthy & Gruber P.C.; Kevin D. McCarthy

(57) ABSTRACT

A controllably displayable motor vehicle window is (20) disclosed provided with at least one optically transmittable glass or plastic panel (22) and an electrically actuated variable light transmission medium (24, 25) disposed in close proximity to the at least one glass or plastic panel. The image displayed on the vehicle window (20) is controllable in response to the electric field generated by a control device (95) in communication with the variable light transmission medium and with a user input device (101-105, 107) A method of advertising or messaging using the controllably displayable motor vehicle window is also disclosed.

20 Claims, 7 Drawing Sheets

CONTROLLABLY DISPLAYABLE MOTOR VEHICLE WINDOW AND METHOD OF ADVERTISING OR MESSAGING WITH THE SAME

CLAIM OF PRIORITY

This application claims priority as a 371 of international application serial number PCT/IL2006/000847 filed on Jul. 20, 2006; which claims priority to Israeli patent application serial number 169824 filed on Jul. 21, 2005.

FIELD OF THE INVENTION

The present invention relates to the field of vehicle windows. More particularly, the invention relates to a vehicle window having an electrically controllable display, which may be used for ornamental or advertising purposes.

BACKGROUND OF THE INVENTION

The present invention relates to a motor vehicle window that is controllably displayable in terms of its color, tint, transparency, and color and textual arrangement by suitable manipulation of an onboard input device.

WO 02/10844 discloses an ornamental window for a vehicle provided with a readily fillable margin formed between two panels, which is filled with a colored material, such as a liquid or gas, that controls the amount of light passing through the ornamental window according to the opacity of the material. A remote control transmitter allows a user to control the passage of colored fluid to the margin between the two panels. Needless to say, the color and/or textual arrangement which are displayable on a normally sized vehicle window by means of the fluid introduced to the margin between the two panels is quite limited. Also, the equipment needed to control the display including control valve, color agent cartridges, and tubes is relatively complex and bulky. Additionally, the display viewable on the ornamental window cannot be instantaneously changed due to the response time of the equipment and of the fluid. Furthermore, the color agent cartridges need to be frequently replenished.

U.S. Pat. No. 5,042,923 discloses a window unit having an electro-shade of adjustable light transmittance. The window unit has spaced window panes, to each of which is adhesively applied an electro-optical conductive polymer cell consisting of two electrodes and an electrolyte disposed therebetween. By varying the amount and polarity of applied direct current or voltage, the transmission of visible and near-infrared radiation can be adjusted.

U.S. Pat. No. 6,819,467 discloses a window assembly having a variable transmission medium disposed in a space between two transparent panels whose visible light transmittance is variable upon the application of an electric field thereto, as well as ultraviolet radiation reducing material.

The window of each of U.S. Pat. Nos. 5,042,923 and 6,819,467 provides only a substantially uniform change of light transmittance, and is therefore not readily adaptable to display a multi-colored advertisement, a textual message, or a video application.

U.S. Pat. No. 6,986,581 discloses a substantially transparent substrate, such as glass or tinted glass, into which light emitting material is integrated. The light emitting material is configured to emit visible light in response to absorption of ultraviolet light from a projector. Thus viewable images, such as a map image on a windshield of an automobile or an advertisement on a store window, are displayed in response to the absorption of ultraviolet light. With respect to this publication, a projector, which adds considerable cost to the price of the apparatus and occupies much needed air space within the interior of the automobile allocated for the comfort of passengers, is required in order to view the images. The projector also needs to be positioned at a specific disposition in order to maximize the resolution of the images.

It is an object of the present invention to provide a controllably displayable motor vehicle window.

It is an additional object of the present invention to provide a motor vehicle window display having a sufficient resolution to support advertising, messaging, or video applications.

It is an additional object of the present invention to provide a motor vehicle window that is controllably displayable, following user selection, within a relative fast response time.

It is an additional object of the present invention to provide a motor vehicle window on which an advertising or messaging image is viewable without need of a projector.

Other objects and advantages of the invention will become apparent as the description proceeds.

SUMMARY OF THE INVENTION

The present invention provides a controllably displayable motor vehicle window, comprising at least one optically transmittable glass or plastic panel and an electrically actuated variable light transmission medium disposed in close proximity to said at least one glass or plastic panel, wherein the image displayed on said vehicle window is controllable in response to the electric field generated by a control device in communication with said variable light transmission medium and with a user input device.

The displayed image is selected from the group of advertising, messaging, ornamental, and video applications.

The variable light transmission medium is selected from the group of at least one layer of electro-optical conductive polymer, a film of electronic ink, which is a liquid substance that responds to electrical impulses to enable changeable non-volatile text and image displays on a flexible surface, electronic paper, which is a portable, reusable non-volatile storage and display medium that has the appearance of paper but can be rapidly and repeatedly written on or refreshed by electronic means thousands or millions of times each second, a liquid crystal display (LCD) panel, a plasma display, which is a computerized video display in which each pixel on the screen is illuminated by a tiny bit of plasma or charged gas that is used to generate analog or digital video signals, a layer of suspended particle devices (SPDs) placed between two panels, which permit the passage of light through the window when an electrical voltage is applied to conductive material applied on the panels, at least one layer of an organic light emitting diode (OLED), and a combination thereof.

The light transmission medium may be configured in many different ways. It may be in sandwiched between two panels. Alternatively, it may be in abutting relation with a panel, such as being adhesively affixed to a panel. The light transmission medium may consist of one or more separate elements such that two different elements may be coplanar, protruding one from the other, or superimposed one on top of the other. Each of these elements may generate an image of the same color or of a different color or pattern.

In one aspect, a data bus for transmitting data associated with the desired image to be displayed is in communication with each light transmission medium element. The data bus is preferably connected by means of a flexible bus to a controller for processing and retrieving the image to be displayed.

In one aspect, the data is wirelessly transmittable by means of a receiver or transceiver installed in the vehicle.

Preferably, the window comprises means for controlling the level of solar radiation transmitted through the window. The solar radiation controlling means is preferably an LCD panel or a layer of SPDs.

The present invention is also related to a method of advertising or messaging, comprising providing a user input device, a control device in communication with said input device, and a controllably displayable motor vehicle window having at least one optically transmittable glass or plastic panel and an electrically actuated variable light transmission medium disposed in close proximity to said at least one glass or plastic panel and in communication with said control device; selecting a desired image of advertising or messaging importance to be displayed on said vehicle window by means of said input device; and generating an electric field by means of said control device which is suitable for controlling the transmittance of said variable light transmission medium so as to display said desired image on said vehicle window.

Preferably, the image to be displayed is varied by selecting, by means of said input device, a desired color, a desired text, a desired graphical arrangement, a desired level of solar radiation to be transmitted through the window, or a desired file retrievable from a suitable database.

In one aspect, the same image is displayed on all windows of the vehicle.

In one aspect, a different image is displayed on each window of the vehicle.

In one aspect, the variable light transmission medium displays an image having a content which is wirelessly transmitted to a receiver or transceiver installed in the vehicle. The receiver or transceiver operates using cellular, Wi-Fi, WiMAX, or satellite data transmission protocols.

DETAILED DESCRIPTION OF PREFERRED EMBODIMENTS

Figure 1:
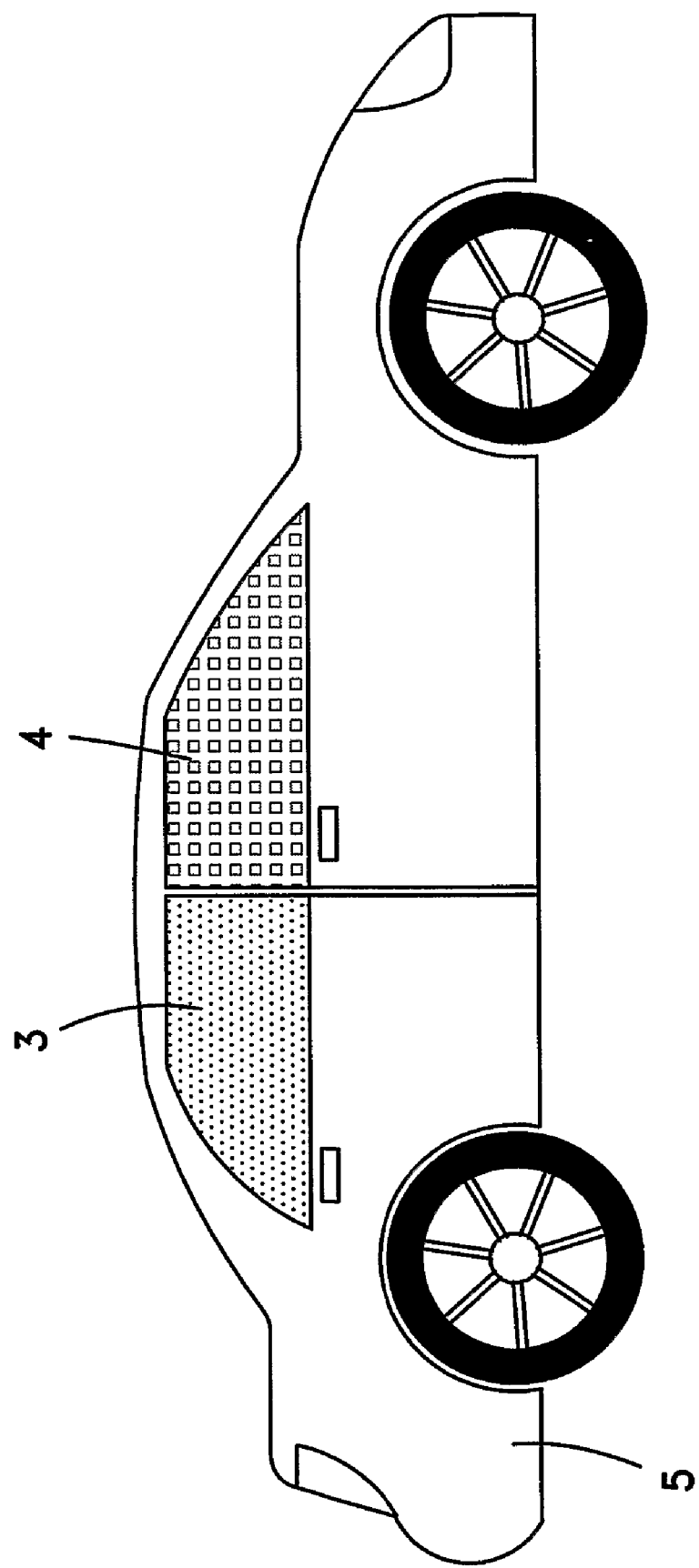
FIG. 1 illustrates a motor vehicle which is provided with controllably displayable windows having a substantially uniform transmittance.
Figure 2:
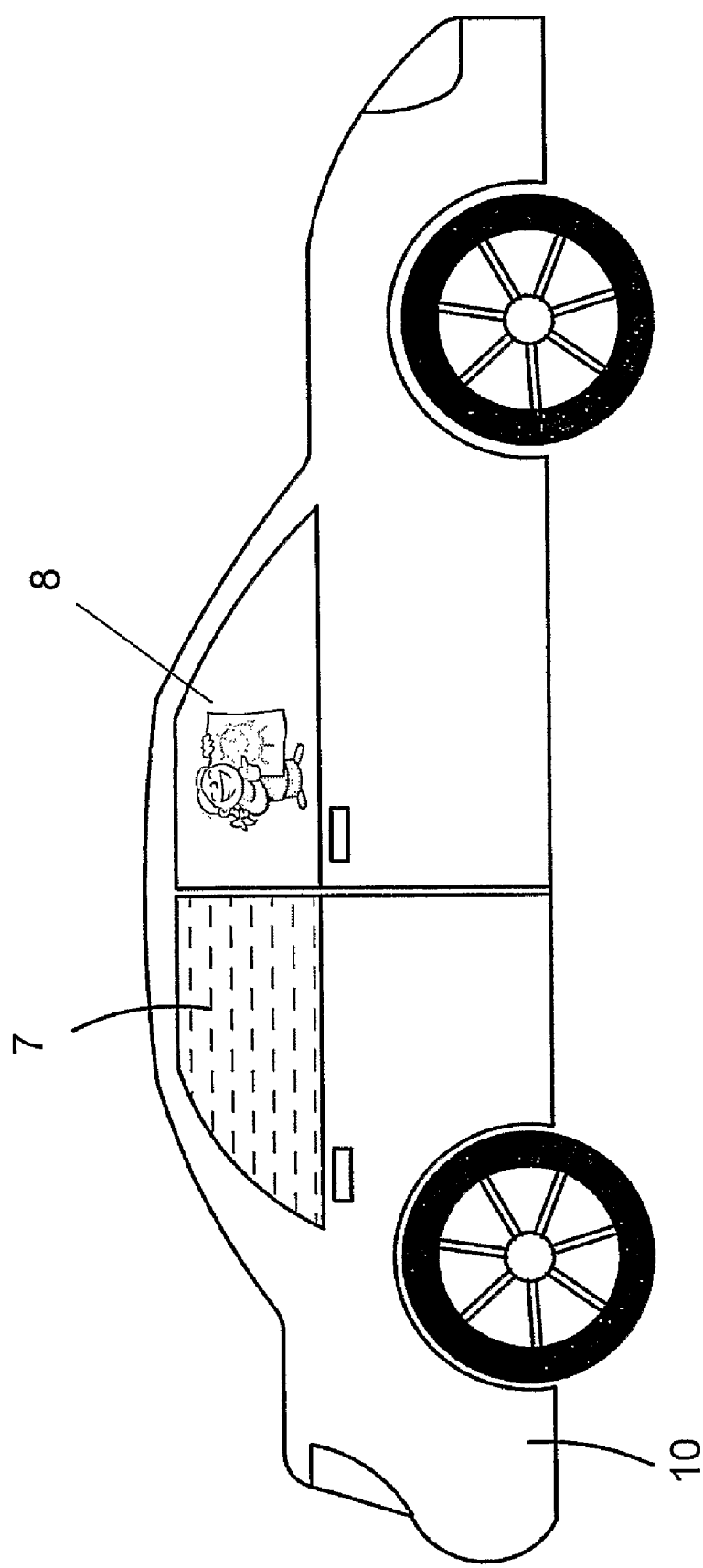
FIG. 2 illustrates a motor vehicle which is provided with one controllably displayable window of substantially uniform transmittance and one of variable transmittance.

FIGS. 1 and 2 illustrate a motor vehicle 5 which is provided with controllably displayable windows, in accordance with the present invention. In FIG. 1, two windows 3 and 4 are shown with a substantially uniform transmittance such that each window displays a different color, e.g. window 3 is yellow and window 4 is pink. A system, which will be described hereinafter, is suitable for causing windows 3 and 4 to display a predetermined uniform color or tint. The displayed color may be similar to that of the vehicle body, or any other desired color. The opacity of windows 3 and 4 is also controllable, e.g. to prevent the influx of solar radiation or to prevent people from viewing the interior of the motor vehicle. In FIG. 2, motor vehicle 10 is shown to have windows 7 and 8 wherein window 7 is of a substantially uniform transmittance and window 8 is of a variable transmittance, displaying a predetermined arrangement of colors and shapes which is suitable for advertising or ornamental purposes. The opacity of windows 7 and 8 is also controllable.

In one embodiment of the invention, a controllably displayable window comprises an electro-optical conductive polymer. The window may be an assembly formed from an electro-optical conductive polymer sandwiched between two glass layers, as well known to those skilled in the art. Alternatively, the window assembly comprises an electro-optical conductive polymer sandwiched between two polymer layers or between a glass layer and a polymer layer.

Figure 3:
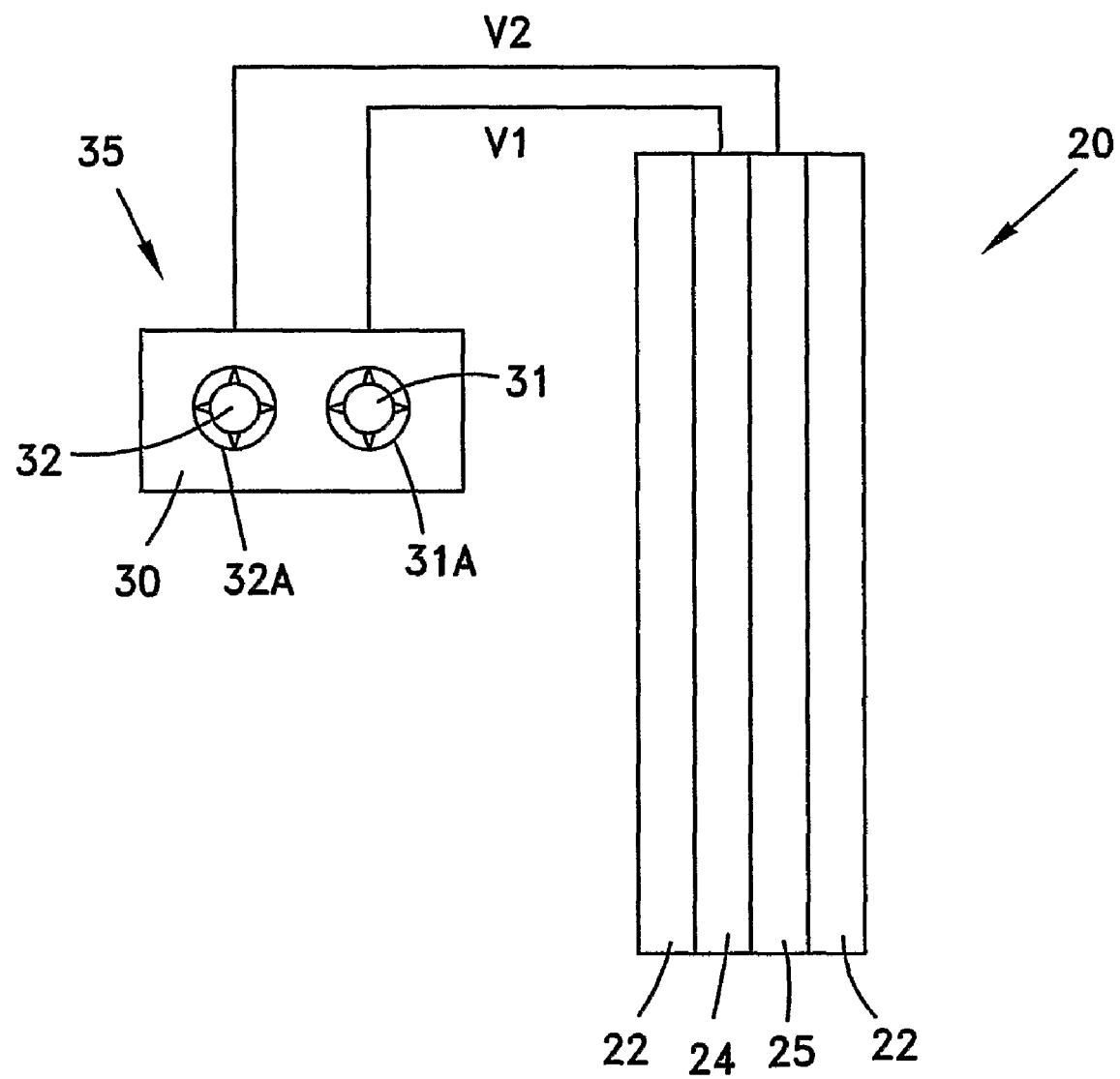
FIG. 3 schematically illustrates a window assembly provided with two inner conductive polymer layers and a suitable system for controlling the display viewable by the window assembly.

If so desired, as shown in FIG. 3, window assembly 20 is multi-layered, to increase the number of possible colors and tints that may be displayable therewith. Window assembly 20 has two outer layers 22, e.g. made of glass or polymer, and two inner conductive polymer layers 24 and 25. System 35 for controlling the display viewable by window assembly 20 comprises selector panel 30 having buttons 31 and 32. By depressing button 31, predetermined voltage V1 is applied to conductive polymer layer 24 and by depressing button 32, predetermined voltage V2 is applied to conductive polymer layer 25. When voltage is applied to one of the conductive polymer layers, a color corresponding to the predetermined voltage is displayed. When both voltage V1 and V2 are applied, the displayed color is a combination of the individual colors of layers 24 and 25. Buttons 31 and 32 may be provided with dials 31A and 32A, respectively, e.g. potentiometers, for adjusting the applied voltage and therefore the opacity of window assembly 20.

A controllably displayable window may comprise a conductive polymer film which is adhesively affixed to a glass panel, as well known to those skilled in the art.

Figure 4:
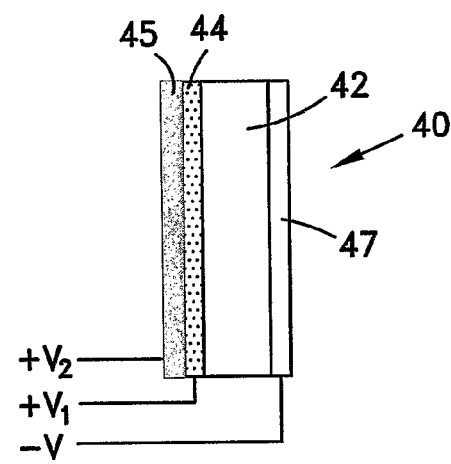
FIG. 4 is a schematic plan view of a window provided with two adhesively affixed conductive polymer films.

FIG. 4 illustrates window 40 comprising glass panel 42, to which two conductive polymer films 44 and 45 are adhesively affixed to the front of glass panel 42, one in front of the other, and transparent electrode 47 is affixed to the rear thereof. For example, films 44 and 45 are provided with an electrode of positive polarity and electrode 47 is of negative polarity. Each film may have the same surface area as glass panel 42, so that window 40 may display the corresponding color of each of the films when voltage is applied thereto or may display the combined color of the two films 44 and 45 when voltage is applied to the two films.

Figure 5:
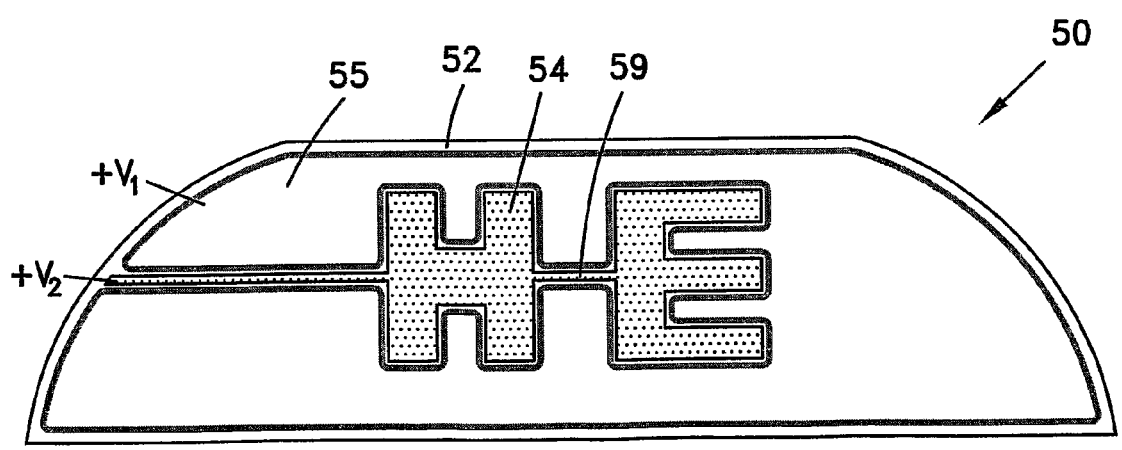
FIG. 5 is a front view of a window provided with two adhesively affixed conductive polymer films formed in predetermined shapes.

As shown in FIG. 5, films 54 and 55 may be of a predetermined shape, and therefore window 50 is suitable for displaying an advertisement or a message. In the illustrated example, film 54 is shaped in the form of letters "HE" while film 55 is formed by a suitable shape that provides the appearance of a background. The letters "H" and "E" of film 54 are interconnected by a thin strip of approximately 1 mm which is not noticeable to an onlooker, despite the electric field that is applied thereto. Films 54 and 55 may coplanar, such that film 55 is shaped in complementary fashion to film 54. After film 55 is affixed to glass panel 52, film 54 is inserted into the open area of film 55 and then affixed to the glass panel. Alternatively, film 55 covers essentially the entire surface area of glass panel 52 and film 54 is superimposed on film 55. Film 54 therefore displays a different color when voltage is applied to both films 54 and 55 as opposed to when voltage is applied only to film 54. To increase the number of possible advertisements or messages that may be displayed by a given vehicle, a different shaped film may be applied to each of the windows. A selector panel may be provided to select the desired advertisement/message to be displayed.

Figure 6:
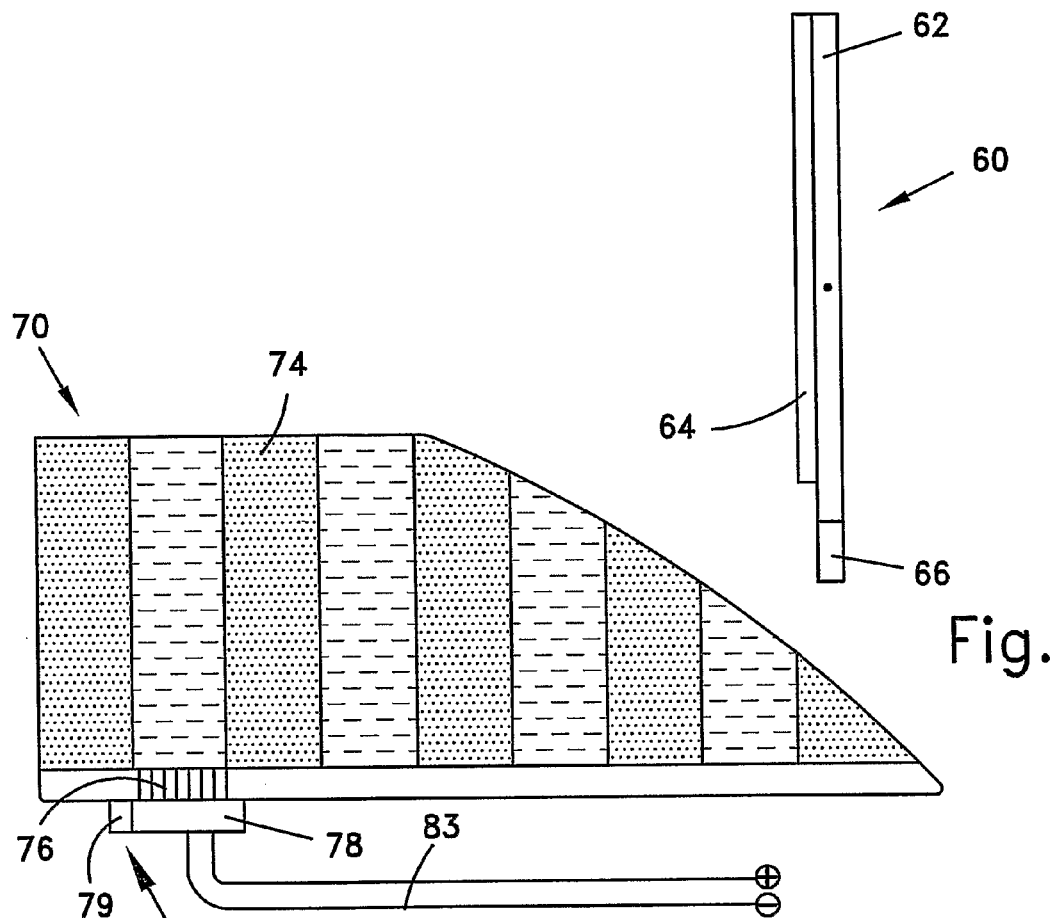
FIG. 6 is a schematic plan view of a window provided with a film of electronic ink.

As shown in FIG. 6, window 60 may comprise film 62 provided with a plurality of microcapsules of electronic ink which is applied to glass panel 64. Electronic ink, which is described for example in http://electronics.howstuffworks.com/e-ink2.htm, is a liquid substance that responds to electrical impulses to enable changeable text and image displays on a flexible surface. Electronic ink consists of millions of tiny capsules filled with dark dyes and containing negatively charged white chips, floating in a liquid medium. Electronic ink-coated material is subjected to electrical impulses that act upon the white chips to make them display as light or dark-colored. A positive charge applied to an area on the top of the display medium causes the white chips to float to the top surface, and a charge applied to an area on the bottom of the medium causes them to drop to the bottom. The pattern of charges applied simultaneously enables the display of images and text. Film 62 is preferably laminated to a layer of circuitry which forms a pattern of pixels that can then be controlled by a display driver, as well known to those skilled in the art. Data bus 66 in data communication with film 62 of electronic ink transmits data associated with the desired image to be displayed by window 60 from a user control panel. The desired image to be displayed may be selected from memory or downloaded.

In another embodiment of the invention, the window may comprise a layer containing a large number of light-absorbing microscopic particles, e.g. rod-like, commonly known as suspended particle devices (SPDs), which are described for example in http://home.howstuffworks.com/smart-window2.htm and manufactured by Research Frontiers Inc., USA. SPDs may be suspended in a liquid suspension or distributed within a film, and the layer may be placed between two glass or polymer panels coated with a transparent conductive material. When an electrical voltage is applied to the conductive material, the SPDs align with the electric field and permit the passage of light through the window. When voltage is not applied, the SPDs are randomly oriented and block the passage of light.

By varying the applied voltage, the amount of transmitted light can be continuously controlled. The voltage level may be controlled by means of a manual device, which may be onboard or may be remotely actuated, or may be automatically controlled by means of photocells or any other suitable sensing device. The layer of SPDs may be in abutting relationship with a glass or plastic panel of the window as shown in FIG. 6, so that the solar energy, including the associated light, heat, ultraviolet radiation and glare, transmitted through a window of any of the embodiments of the present invention may be controlled. Alternatively, the layer of SPDs may be arranged in a predetermined shape, e.g. as shown in FIG. 5, so that when the SPDs are in a light state the image can be viewed and when the SPDs are in a dark state the image is not visible.

Figure 7:
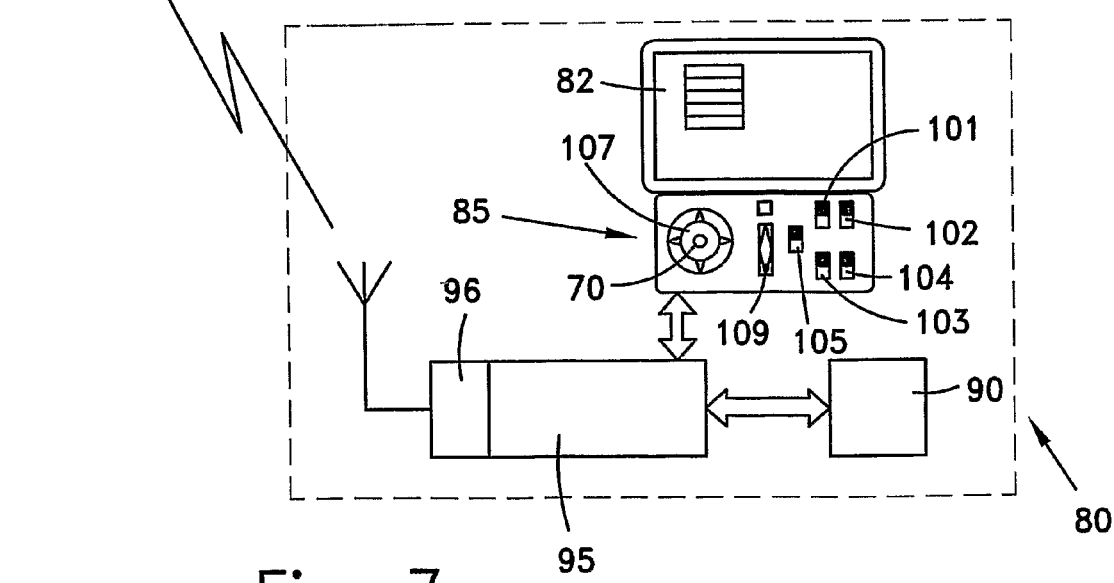
FIG. 7 schematically illustrates a window provided with a liquid crystal display and a suitable system for controlling the display viewable by the window.

FIG. 7 schematically illustrates another embodiment of the invention wherein window 70 comprises a liquid crystal display (LCD) panel 74 having an LCD layer sandwiched between layers of glass. The LCD layer has a matrix of pixels each of which is capable of becoming opaque in response to the application of a suitable current thereto, as well known to those skilled in the art. The contrast between the opaque and transparent areas forms visible characters and shapes, and the color and opacity of groups of pixels can be controlled so as to display a desired image. Data bus 76 for transmitting data associated with the desired image to be displayed is disposed below LCD panel 74 and is concealed by a vehicle door. Data bus 76 is suitable for transmitting data to each pixel. Controller 78 is disposed beneath data bus 76 and is provided with a wireless receiver 79, e.g. a Bluetooth receiver or an antenna for the reception of data via a cellular or satellite network. Cable 83 connects controller 78 with the vehicle battery.

System 80 for controlling the display viewable by window 70 is located proximate to the dashboard of a motor vehicle, and comprises selector panel 85, database 90, and controller 95. Control panel 85 is provided with a screen 82 and a plurality of user input devices including window select buttons 101-105, dimmer 107, and menu select buttons 109 and 110. A selected image or video may be displayed on one of the four windows by depressing one of the corresponding window select buttons 101-104 and on all of the windows simultaneously by depressing button 105. The opacity of a selected window can be adjusted by means of dimmer 107. A plurality of images is stored in database 90, and these images are viewable on screen 82 by browsing a menu by means of browsing button 109 and menu select button 110. Upon depressing menu select button 110, the data associated with a desired image to be displayed is loaded onto screen 82 by controller 95 and is also transmitted subsequently to wireless receiver 79 by means of wireless transmitter 96, e.g. a Bluetooth transceiver, in communication with controller 95.

Figure 8:
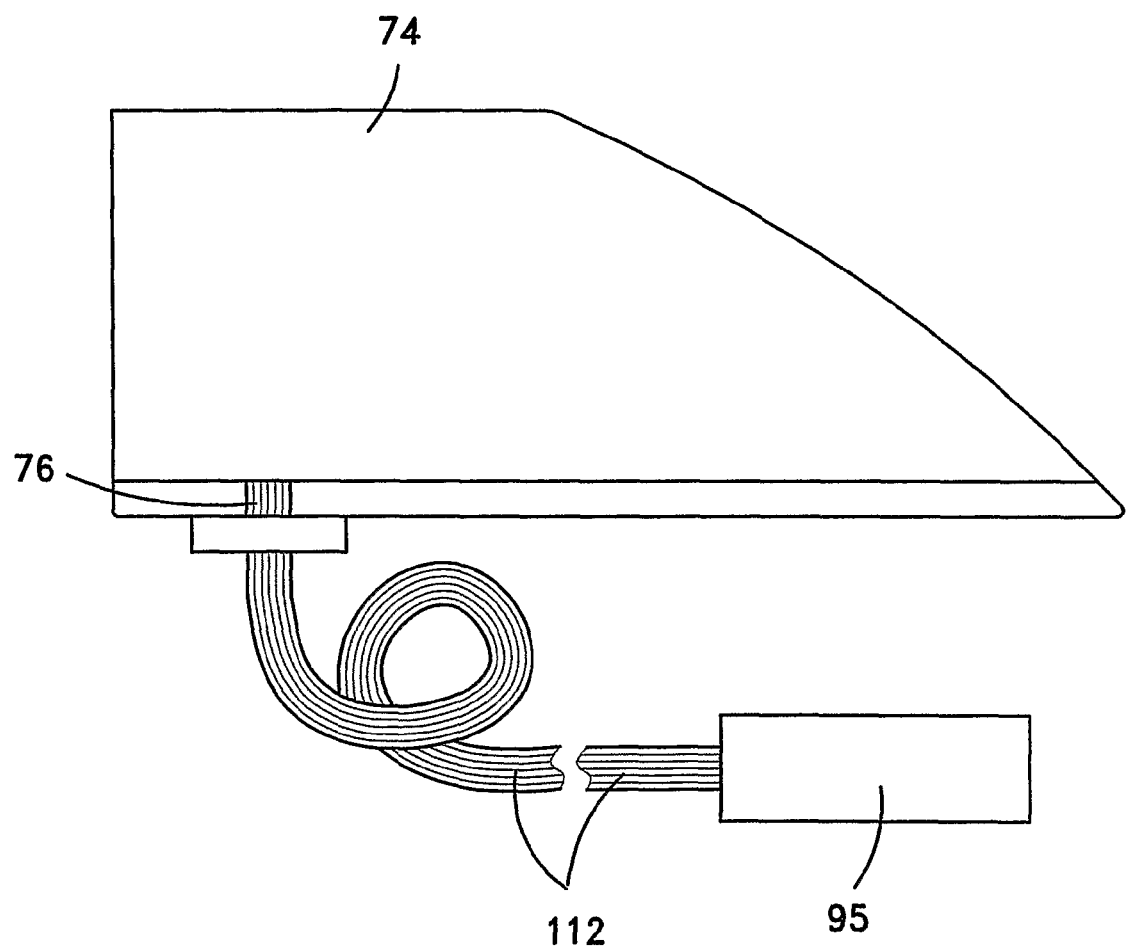
FIG. 8 is a schematic front view of a data bus and a flexible bus in communication with a liquid crystal display.

As shown in FIG. 8, data bus 76 of LCD panel 74 may be connected with controller 95 for processing and retrieving the image to be displayed by means of flexible bus 112.

Figure 9:
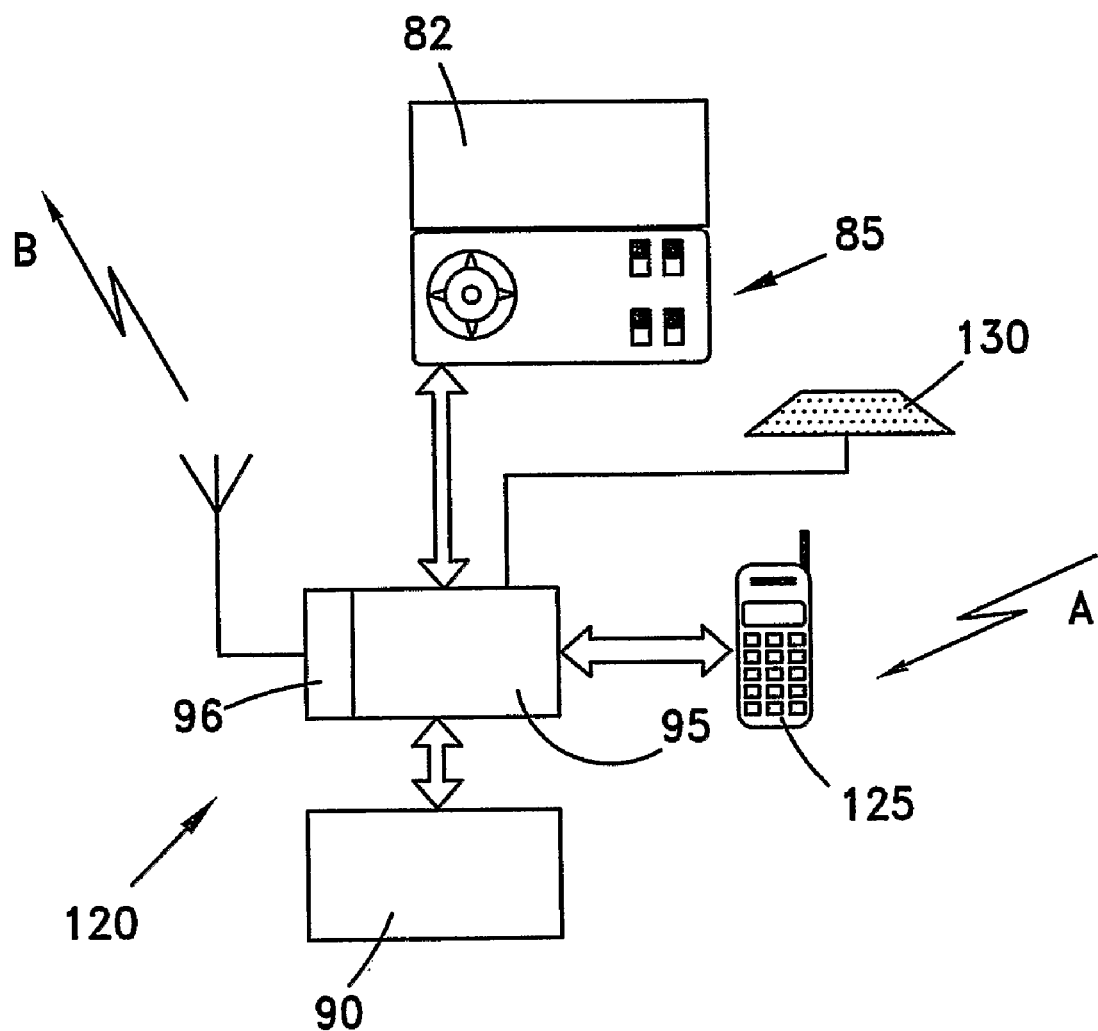
FIG. 9 is a schematic illustration of a system for downloading a selected image and for transmitting the downloaded image to a controllably displayable window.

FIG. 9 schematically illustrates system 120 for controlling the display viewable by a window provided with an LCD panel, a film of electronic ink, or any other suitable electrically actuated variable transmission medium. System 120 is located proximate to the dashboard of a motor vehicle, and comprises selector panel 85, database 90, controller 95, and cellular phone 125. Control panel 85 is provided with a screen 82 and a plurality of user input devices including window select buttons 101-105, dimmer 107, and menu select buttons 109 and 110. Upon depressing menu select button 110, the data associated with a desired image to be displayed is downloaded by means of cellular phone 125 from a base station via long-range radio frequency signal A to controller 95, whereupon the downloaded data is transmitted by means of wireless transmitter 96 via short-range radio frequency signal B to the wireless receiver of the vehicle window. In this fashion, a desired image or video to be displayed for advertising, messaging, or ornamental purposes may be user selected and then transmitted to the controller of the vehicle window. The corresponding data bus transmits portions of the image data to corresponding regions of the variable transmission medium so that a continuous undistorted image of sufficient resolution will be viewable. If so desired, a personally designed image may be generated by system 120 with use of a suitable graphic editing program uploaded from controller 95 and with an onboard keypad 130.

The system described above may be operated using different protocol of wireless data transmissions for displaying an advertisement or a message, such as Wi-Fi (short for "wireless fidelity", is a term for certain types of Wireless LAN of specifications IEEE 802.11, and has gained acceptance in many places as an alternative to the Wired LAN), Infra-Red (IR) data transmission, WiMAX (The WiMAX protocol is a way of networking computerized devices together; for example to provide internet access, in a similar way to Wi-Fi), or a protocol for transmissions over a satellite network, such as S-LACP (Satellite-Link Aware Communication Protocol). In addition, the display of an advertisement or a message can be location based. Location data may be obtained, for example, if the vehicle has a GPS system, a cellular phone or any other transceiver, which transmits data to a center that can calculate its location. In this case, the displayed advertisement or message will be adapted to the population in the vicinity of the vehicle's location.

In another embodiment of the invention, the window may comprise a layer containing an organic light emitting diode (OLED), which is described for example in http://electronics.howstuffworks.com/oled.htm.

An OLED having a thickness of only several hundred nanometers consists of a substrate, an anode, organic layers including a conducting layer and emissive layer which are made of organic molecules or polymers, and a cathode. The OLED emits light after electrical current flows from the cathode to the anode through the organic layers, adding electrons to the emissive layer and removing electrons from the conductive layer. As an electron is filled in one of the formed holes, energy is released in the form of a photon. The color of the emitted light depends on the type of organic material used and the level of the generated current. An OLED suitable for the present invention may be configured as a flexible OLED (FOLED), a transparent OLED (TOLED), a phosphorescent OLED (PHOLED), or a combination thereof, in order to provide a controllable display.

While some embodiments of the invention have been described by way of illustration, it will be apparent that the invention can be carried into practice with many modifications, variations and adaptations, and with the use of numerous equivalents or alternative solutions that are within the scope of persons skilled in the art, without departing from the spirit of the invention or exceeding the scope of the claims.

The invention claimed is:

1. A system for controllably displaying an image on a motor vehicle window, comprising
   (a) at least one optically transmittable glass or plastic panel; and
   (b) an electrically actuated variable light transmission medium disposed in close proximity to said at least one glass or plastic panel;
   (c) a data bus in communication with light transmission medium, for transmitting data associated with a desired image to be displayed;
   (d) a vehicle transceiver for wirelessly transmitting position data of said vehicle;
   (e) a remote center for receiving position data from a plurality of vehicles, comprising a database of a plurality of image data types, a center transceiver for receiving said transmitted position data, and a processor for determining, base on a location of said vehicle and on predetermined rules, a type of location based image data to be wirelessly transmitted via said center transceiver to said vehicle transceiver; and
   (f) a control device in communication with said variable light transmission medium for generating an electric field for generating a corresponding image displayable on said at least one optically transmittable glass or plastic panel, in response to said transmitted location based image data type.

2. The system according to claim 1, wherein the displayed image is selected from the group consisting of advertising, messaging, ornamental, and video applications.

3. The system according to claim 1, wherein the light transmission medium is sandwiched between two panels.

4. The system according to claim 1, wherein the light transmission medium is in abutting relation with a panel.

5. The system according to claim 4, wherein the light transmission medium is adhesively affixed to a panel.

6. The system according to claim 1, wherein the light transmission medium consists of one or more separate elements.

7. The system according to claim 1, wherein the data bus is connected by means of a flexible bus to a controller for processing and retrieving the image to be displayed.

8. The system according to claim 1, wherein the variable light transmission medium is selected from the group consisting of at least one layer of electro-optical conductive polymer, a film of electronic ink, a film of electronic paper, a plasma display, a liquid crystal display (LCD) panel, a layer of suspended particle devices (SPDs), at least one layer of an organic light emitting diode (OLED), a flexible variable light transmission medium, and a combination thereof.

9. The system according to claim 8, comprising means for controlling the level of solar radiation transmitted through the window.

10. The system according to claim 8, wherein the solar radiation controlling means is a layer of SPDs.

11. The system according to claim 1, further comprising a control panel located proximate to a vehicle dashboard, including at least one user input device for adjusting the transmitted location based image data.

12. The system according to claim 11, wherein the control panel comprises a screen, and the at least one user input device comprises an onboard keypad in communication with the control device and a graphic editing program, a user designed image being displayable on said screen prior to being displayable on the at least one optically transmittable glass or plastic panel.

13. The system according to claim 12, wherein the control panel further comprises a local database and a downloading initiating device, and the at least one user input device comprises at least one menu select button, user selected image data being downloadable to said local database by means of said downloading initiating device and said at least one menu select button and being displayable on the screen.

14. The system according to claim 13, wherein one of the user designed image, user selected image and location based image is displayable on the at least one optically transmittable glass or plastic panel upon user selection by means of a first user input device,
   the glass or plastic panel on which the one of the user designed image, user selected image and location based image is displayable being selected by means of a second user input device,
   the brightness of the one of the user designed image, user selected image and location based image being adjustable by means of a third user input device.

15. The system according to claim 1, wherein the location based image data and position data are wirelessly transmittable according to a data transmission protocol selected from the group consisting of cellular, Wi-Fi, WiMAX, and satellite data transmission protocols.

16. A method of advertising or messaging, comprising:

a) providing a controllably displayable motor vehicle window having at least one optically transmittable glass or plastic panel and an electrically actuated variable light transmission medium disposed in close proximity to said at least one glass or plastic panel;

b) providing a control device in communication with said variable light transmission medium for generating an electric field for generating a corresponding image displayable on said at least one optically transmittable glass or plastic panel;

c) wirelessly transmitting position data of a vehicle to a remote center, said center comprising a database of a plurality of image data types;

d) downloading from said database, based on a location of said vehicle and on predetermined rules, a type of image data of advertising or messaging importance to be wirelessly transmitted from said center to said control device; and e) wirelessly transmitting said downloaded image data from said center to said control device, whereby to control the transmittance of said variable light transmission medium so as to display an image corresponding to said downloaded image data on said vehicle window.

17. The method according to claim 16, further comprising the step of adjusting the transmitted downloaded image data by means of at least one user input device located proximate to a vehicle dashboard by performing an operation selecting from the group consisting of selecting a desired color, selecting a desired tint, selecting a desired window opacity, selecting a desired text, selecting a desired graphical arrangement, selecting a desired level of solar radiation to be transmitted through the window, and selecting a desired file to be retrieved from a local database.

18. The method according to claim 16, wherein the same image is displayed on all windows of the vehicle.

19. The method according to claim 16, wherein a different image is displayed on each window of the vehicle.

20. The method according to claim 16, wherein the location based image data and position data are wirelessly transmitted according to a data transmission protocol selected from the group consisting of cellular, Wi-Fi, WiMAX, and satellite data transmission protocols.

* * * * *